C. F. HOVEY.
Beer-Cooling Apparatus.
No. 196,297.        Patented Oct. 23, 1877.
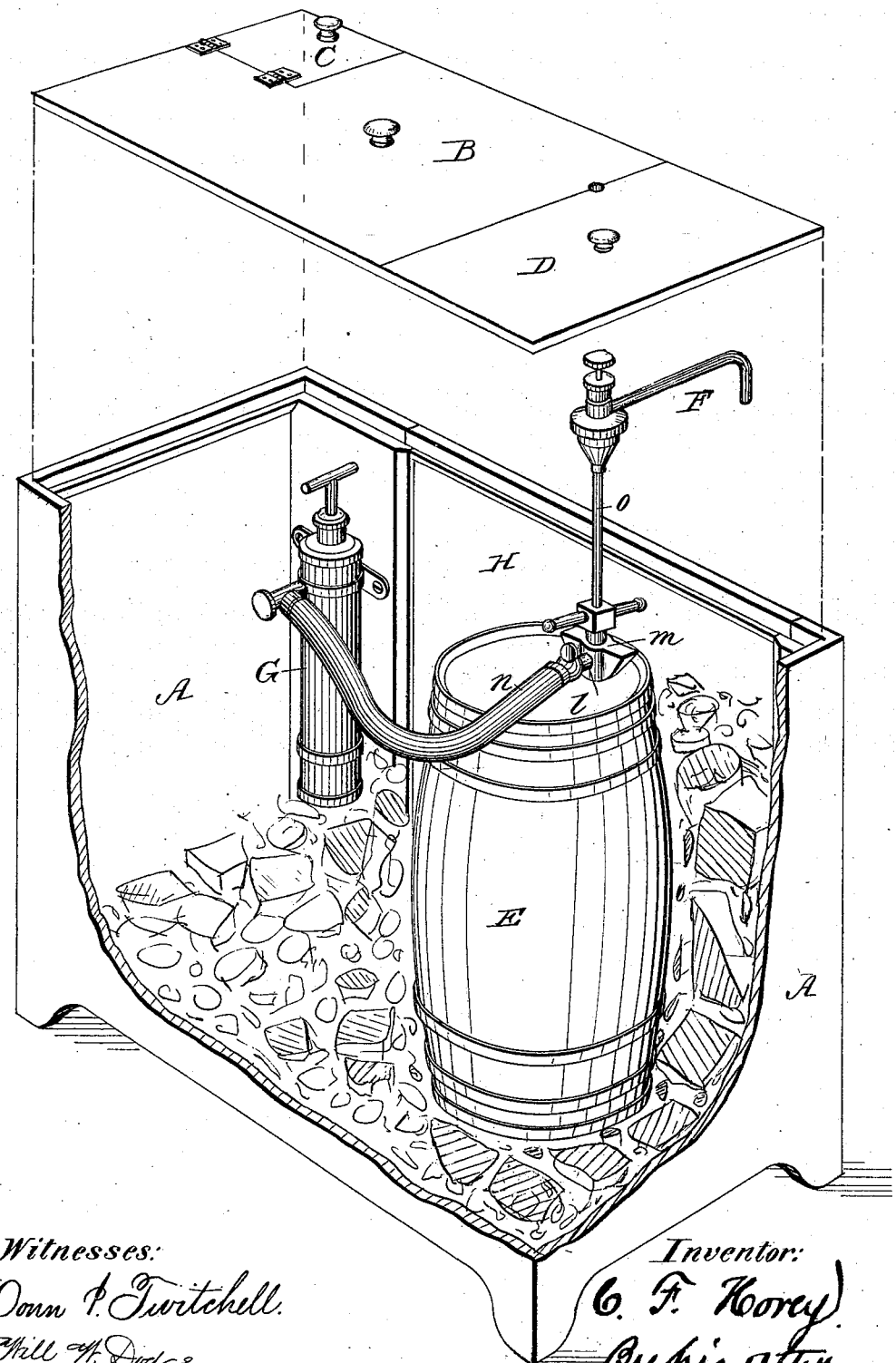
Witnesses:
Donn P. Twitchell
Will H. Dodge
Inventor:
C. F. Hovey
By his attys
Dodge & Son

UNITED STATES PATENT OFFICE.

CHARLES F. HOVEY, OF SPRINGFIELD, MASSACHUSETTS.

IMPROVEMENT IN BEER-COOLING APPARATUS.

Specification forming part of Letters Patent No. 196,297, dated October 23, 1877; application filed August 22, 1877.

*To all whom it may concern:*

Be it known that I, CHARLES F. HOVEY, of Springfield, in the county of Hampden and State of Massachusetts, have invented certain Improvements in Beer-Cooling Apparatus, of which the following is a specification:

My invention relates to beer cooling and drawing apparatus; and it consists in so constructing and arranging the same that when complete it shall be readily portable, compact, and cheap in construction; and it further consists in so arranging the pump by which air is forced into the cask to cause the beer to flow that it shall receive its supply of air entirely from the interior of the ice-chest or cooling-chamber, and thus convey only pure cold air to the cask, as hereinafter more fully explained.

As hitherto constructed, the pump by which air is forced into the cask has commonly been placed under the counter at which the beer is served, in order to be within easy reach of the operator, while the cask is usually located in a cellar below, in order to be kept cool, it being sometimes placed within an ice-box for that purpose. From the cask two pipes extend upward into the room in which the beer is served, one communicating with the pump, and the other terminating in a faucet from which the beer flows. When it is desired to draw beer from the faucet, the pump is operated, which forces air into the cask until a pressure is created therein sufficient to cause the beer to flow up through its pipe and out at the faucet. It is also a common practice to form the pipe through which the beer passes to the faucet into a coil, said coil being located in a cooling-chamber, so that the beer shall be cooled during its passage to the faucet.

It will be seen that when thus arranged it is necessary to have a cellar, and to use long pipes for the air and beer to pass through, and it will also be noticed that the air which is supplied to the cask is taken from the room in which the beer is served.

These facts render this arrangement very objectionable, for several reasons. In the first place, the great length of pipes necessitates a large supply of air to the cask, and at a greater pressure than where short pipes are used, while the beer, in passing through any considerable length of pipe, is very apt to take up foreign matter, which injures it, and in many cases poisons it. Then, too, the apparatus thus arranged is necessarily a permanent fixture, incapable of being transported from place to place. But probably the greatest objection to this arrangement lies in the fact that, as before stated, the supply of air to be forced into the cask is taken from the room in which the beer is served. As this is usually done in a bar-room or restaurant in which a number of persons are congregated, and in which the temperature is always higher than that of the beer, it is apparent that warm, vitiated air will be forced into the cask. This greatly injures the beer, causing it not unfrequently to become flat and unfit for use before the cask is near emptied.

It is to obviate these difficulties, and to produce a cooler which may be readily transported from place to place for use, and which may be placed under an ordinary counter, that my invention is designed.

To this end I construct a chest, A, of wood or other suitable material, and line its interior partially or entirely with galvanized sheet-iron, zinc, or other suitable material, after the manner of constructing an ordinary ice-chest. The chest is provided with one or more removable sides, H, and a removable cover or top, B, through which access may be had to the interior of the chest. At or near one end of the chest, inside of the same, is located an air-pump, G, of any suitable construction, it being secured to one of the walls of the chest by means of screws or other suitable means.

The cask which contains the beer is placed inside of the chest, in such position as to leave an open space all around it between it and the walls of the chest. In the upper end of the cask a cylindrical tubular plug or "drive," *m*, is inserted, and through this plug passes a tube, *o*, the lower end of which passes down to, or nearly to, the bottom of the cask, while its upper end terminates in a faucet, F, of any suitable construction. A packed joint is formed at the upper end of the plug or drive *m*, where the tube *o* passes through it, but below this point an annular space is left between the tube *o* and the interior of the plug or drive *m*. A tubular projection, *l*, is formed on one side of the plug or drive m, communicating with the annular space just mentioned, so that by connecting the pump G and the tubular projection l, by means of a short tube or pipe, n, air will be caused to pass into the cask E when the pump is operated, and may be held there by turning the small cock shown near the tubular projection.

It will be observed that all the parts of this apparatus are placed within the chest, except the faucet F. After they are all properly arranged in place, ice is packed in around them to the required amount, and the cover or top B placed in position. In order to allow the cover or top to be placed in position without removing or in any way interfering with the faucet F, the cover is divided into two parts, B and D, as shown, at a point directly in line with the tube or pipe o, a semicircular notch being made in each section to fit around the same.

In order to close the lid or cover when the pump is not being used, and at the same time to render the pump readily accessible, a portion of the lid, C, is cut out and hinged to the main portion B, as shown, the portion C being directly over the pump. If preferred, however, the handle of the pump may extend up through the top or cover in the same manner as the tube o; or the pump may be attached to the outside of the chest, with its supply-pipe opening into the same.

The pump, cask, and tubes being all placed within the ice-chest, it is apparent that the air which is forced into the cask must be cold and pure, and the pipes being short, the air and beer will pass through them without becoming in any way affected thereby.

The apparatus thus constructed occupies but a small amount of space, and can be placed under an ordinary counter, or it may be made ornamental in appearance and placed in sight; can be taken from place to place for picnics and excursions, and is cheap to manufacture.

The drive and sliding tube will form the subject of a separate patent.

I do not claim, broadly, an ice-chest containing an air-pump, and adapted to receive a cask, for I am aware that a chest of this character, arranged to contain the pump and cask in separate unconnected compartments, and to cool the air by forcing it through a vessel filled with water and ice, has been hitherto patented.

Having thus described my invention, what I claim is—

1. The combination of the ice-chest having the single internal chamber, adapted to receive a cask, with the air-pump mounted in and arranged to receive air from said chamber, and the pipe adapted to convey air from the pump to the cask, substantially as shown.

2. The ice chest or chamber, adapted to receive a cask, provided with the internal upright air-pump and the top door C, as shown, so that the pump may be operated from the outside while surrounded by ice.

3. In a beer-cooler, an air-pump mounted in and arranged to receive air from the chamber in which the cask and its surrounding ice are placed, substantially as shown and described.

4. The combination of the chest having the removable front and sectional top, and the single internal chamber, with the air-pump G, cask E, and connecting-tube n mounted therein, and the discharge-pipe extending downward within the cask and upward through the top of the chest.

CHARLES F. HOVEY.

Witnesses:
J. P. BUCKLAND,
WM. G. WHITE.